United States Patent [19]

Wheeler

[11] 4,081,838
[45] Mar. 28, 1978

[54] CONTRAST CONTROL CIRCUITRY FOR A VIDEO PROCESSING SYSTEM

[75] Inventor: Robert C. Wheeler, Elba, N.Y.

[73] Assignee: GTE Sylvania Incorporated, Stamford, Conn.

[21] Appl. No.: 760,361

[22] Filed: Jan. 19, 1977

[51] Int. Cl.² .......................... H04N 5/14; H04N 5/68
[52] U.S. Cl. ..................................... 358/169; 358/161; 358/243
[58] Field of Search ..................... 358/161, 169, 243

[56] References Cited

U.S. PATENT DOCUMENTS

| | | | |
|---|---|---|---|
| 3,804,981 | 4/1974 | Avins | 358/169 |
| 3,928,867 | 12/1975 | Lynch | 358/169 |

*Primary Examiner*—Robert L. Richardson
*Attorney, Agent, or Firm*—Norman J. O'Malley; Thomas H. Bufftton; Robert E. Walrath

[57] ABSTRACT

A video processing system for a television receiver is shown. The video processing system includes a gain controlled stage through which a video signal is coupled. The gain of the stage is controlled to provide contrast control of the video signal. The gain of the gain controlled stage is also automatically controlled in response to a beam current feedback to provide automatic contrast or white level control. In addition, the automatic control circuit provides beam circuit limiting by reducing the gain of the gain controlled stage to minimum in response to beam currents in excess of a threshold. An aperture correction signal is also coupled through the gain controlled stage so that it is amplified or attenuated by the same amount as the video signal. The output of the gain controlled stage is coupled to an output stage where the black level of the video signal is controlled by a black level control circuit. The disclosed video processing system is further adapted for fabrication in integrated circuit form.

5 Claims, 2 Drawing Figures

CONTRAST CONTROL CIRCUITRY FOR A VIDEO PROCESSING SYSTEM

CROSS-REFERENCE TO RELATED APPLICATIONS

K. J. Burdick et al., "Automatic Peaking Control Circuitry For A Video Processing System," Ser. No. 760,366, filed Jan. 19, 1977; R. C. Wheeler, "Aperture Correction Circuitry For A Video Processing System," Ser. No. 760,283, filed Jan. 19, 1977, A. H. Klein, "Blanking Circuitry For A Television Receiver Video System," Ser. No. 760,364, filed Jan. 19, 1977, "Video Processing System," Ser. No. 760,284, filed Jan. 19, 1977, all filed the same date and assigned to the same assignee as this application. D. W. Constable, "Ambient Light Contrast and Color Control Circuit," Ser. No. 689,997, filed May 26, 1976, and assigned to the same assignee as this application.

FIELD OF THE INVENTION

This invention relates to contrast control circuitry for a video processing system for television receivers and more particularly to contrast control circuitry for controlling the gain of a gain controlled stage in a video processing system.

BACKGROUND OF THE INVENTION

Composite video signals of the type used in television systems include video and synchronizing information. The video information is divided into sequential trace and retrace signals with the synchronizing information transmitted as pulses during the retrace portion of the video information. During the trace interval, the video signal varies between black and white levels. The retrace interval video signal includes a blanking portion which is at or slightly greater than black level so that the electron beam in the cathode ray tube (CRT) is turned off during retrace. If all of the levels of the various components of the video signal are properly adjusted at the studio and properly transmitted and received, the video signals can be properly displayed on a CRT screen. Unfortunately, adjustment errors and transmitting and receiving errors require processing and correction of the video signal to achieve a satisfactorily displayed image.

Some of the more common errors in the received signal include improper black and white levels and improper synchronizing pulse amplitude. Since the automatic gain control in typical television receivers sets-up on the synchronizing pulse amplitude, improper synchronizing pulse amplitude can cause the received signal to be amplified more or less than desired. If the black level of the trace interval signal is set improperly with respect to the blanking level, the displayed image will be too dark or too light depending upon the direction of the error. Similarly, an improperly set white level will result in improper contrast assumming black level is set correctly. In typical television receivers, the contrast and brightness controls can be used to correct, at least in part, for such errors. Adjustment of the contrast and brightness controls to correct erroneous composite video signals, however, cannot correct all errors and necessitates frequent readjustment to provide a proper displayed image.

The signals received by a television receiver are typically provided by a variety of sources each of which can have different errors in signal levels necessitating readjustment of the contrast and brightness controls to produce a properly displayed image. For example, when channels are changed, any signal level errors will necessarily be different. Also, on the same channel the signal may be provided by a variety of sources in the studio such as different cameras, video tape, movie film, and the like. Since each source can have its own unique characteristics, switching from one source to another can alter the signal levels. Compensation for the different signal levels of the various studio signal sources is generally incomplete. Accordingly, the composite video signal received by a television receiver may also include undesired variations in signal levels.

Prior art television receivers have included various forms of automatic control circuitry in an attempt to compensate for such undesired contrast and brightness variations. One prior art form of black level control includes the so-called "back porch clamp" which clamps the black level of the video signal to the blanking level. If the black level of the video signal is improperly set with respect to the blanking level, however, this form of automatic black level control does not correct the signal properly.

Another form of automatic contrast and brightness control involves detecting and clamping to the blackest and whitest portions of the received signal. While such circuitry circumvents the primary disadvantages of back porch clamping, under some signal conditions the displayed image is improper. For example, on scenes where there is no black in the image, the control circuitry can improperly clamp to a portion of the image not intended to be black and cause those portions to be black. Similarly, in a dark scene with no white level signals intended, the lightest part of the image can be clamped to white level thereby distorting the intended and desired image. Control circuitry of this type generally also requires peak detecting and sample and hold circuits. Since such circuits will tend to set-up on blanking interval signals, a blanking generator which anticipates the blanking intervals is necessary. Providing such circuitry requires substantial expense and circuit complexity for proper operation.

Other forms of automatic contrast and brightness control circuitry have been used; however, known prior art circuitry of this type, including the types mentioned above, has numerous deleterious effects. For example, the compensation for video signal errors can be incomplete or incorrect under varying signal conditions. Additionally, some forms of prior art circuitry are unduly complex and expensive or require compromises which deleteriously effect the displayed image.

Prior art television receivers commonly include beam current or brightness limiting circuitry. Such circuitry typically detects beam currents in the cathode ray tube in excess of a threshold and limits the video signal drive to the cathode ray tube in response to the excessive beam currents. Typically, such circuitry detects the excessive beam currents by detecting the current on the low voltage or return side of the voltage multiplier which provides the high voltage to the cathode ray tube. Such prior art beam current limiters, however, merely limit excessive beam current. If the beam current is below the threshold, the beam current limiter does not control the video signal.

OBJECTS OF THE INVENTION

Accordingly, it is a primary object of this invention to obviate the above noted and other disadvantages of the prior art.

It is a further object of this invention to provide a new and novel video processing system for television receivers.

It is a still further object of this invention to provide a video processing system with the capability of optimum correction of video signal errors.

It is a yet further object of this invention to provide a video processing system which incorporates novel contrast control circuitry.

It is a further object of this invention to provide a video processing system with automatic contrast or white level control.

It is a still further object of this invention to provide a video processing system with automatic contrast control responsive to beam current feedback.

It is a yet further object of this invention to provide a video processing system with automatic contrast control responsive to beam current feedback which incorporates beam current limiting circuitry.

It is a yet further object of this invention to provide a contrast control circuitry for a video processing system suitable for fabrication in integrated circuit form.

SUMMARY OF THE INVENTION

The above and other objects and advantages are achieved in one aspect of this invention in contrast control circuitry for a video processing system including a gain controlled stage, first and second bias means, and a control circuit. The gain controlled stage has a video signal input and first and second gain control inputs. The first bias means provides a relatively constant voltage to the first gain control input, while the second bias means provides a variable voltage to said second gain control input. The gain controlled stage controls the amplitude of video signals applied to the video signal input in accordance with the difference between the voltages applied to the first and second gain control inputs. The control circuit is connected to the second bias means and includes a manually variable impedance for causing the second bias means to vary the variable voltage to cause the gain of the gain controlled stage to vary between maximum and minimum limits.

In another aspect of this invention the above and other objects and advantages are achieved by contrast control circuitry for a video processing system in a television receiver having a cathode ray tube and a high voltage circuit connected to the cathode ray tube for providing an energizing voltage thereto. The contrast control circuitry includes a gain controlled stage, a manually variable impedance, resistance means, bias means, and feedback means. The gain controlled stage has a video signal input and a gain control input. The resistance means is connected to an output of the impedance. The bias means is connected between the resistance means and the gain control input of the gain controlled stage for providing a gain control signal to the gain control input in response to the setting of the variable impedance. The feedback means is connected between the high voltage circuit and the resistance means for modifying the gain control signal in response to the current through the high voltage circuit to automatically control the contrast of video signals applied to the video signal input.

DETAILED DESCRIPTION OF THE PREFERRED EMBODIMENT

For a better understanding of the present invention, together with other and further objects, advantages and capabilities thereof, reference is made to the following disclosure in conjunction with the accompanying drawings.

Figure 1:
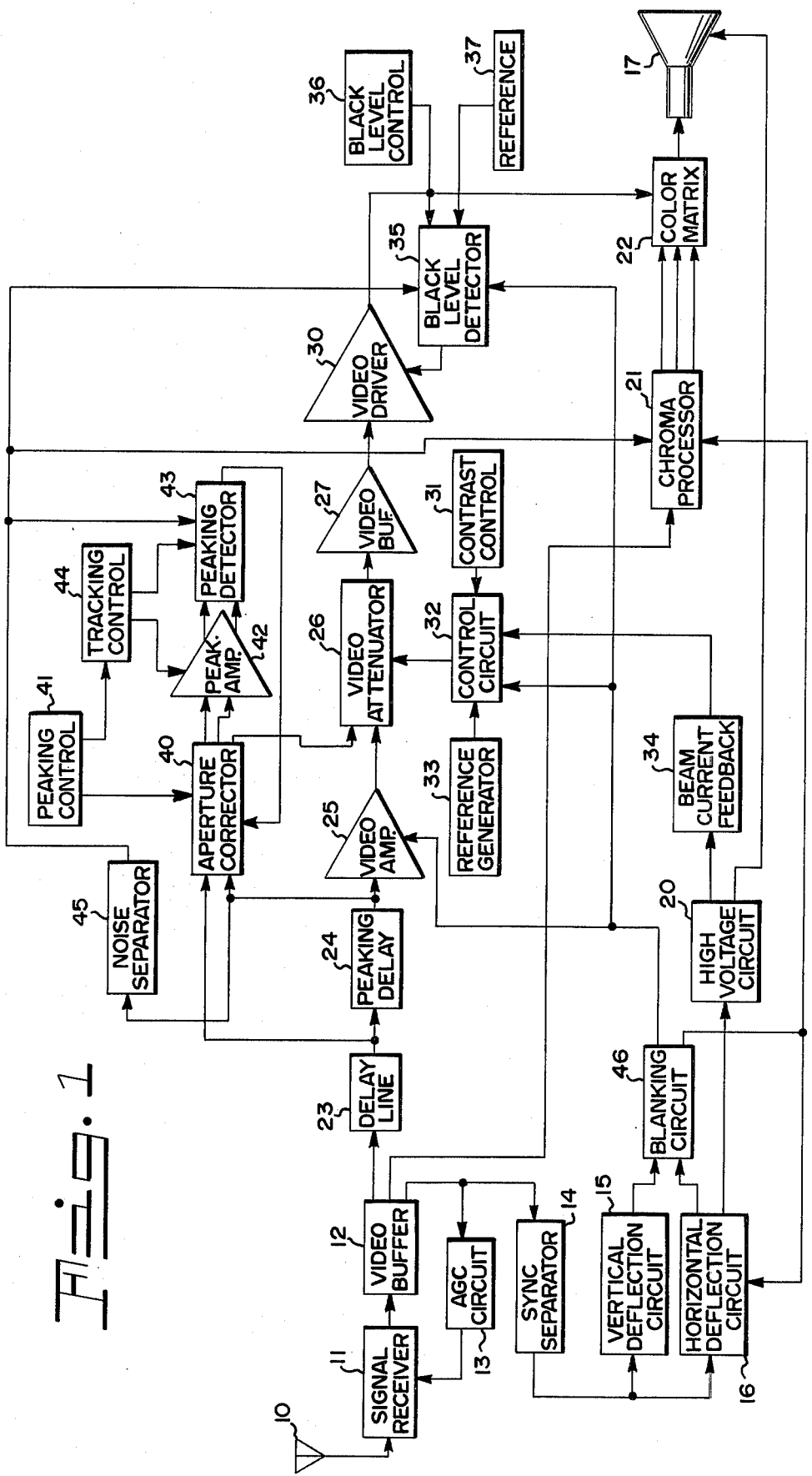
FIG. 1 is a block diagram of a television receiver including a video processing system incorporating a preferred embodiment of the invention.

FIG. 1 is a block diagram of a television receiver incorporating a video processing system incorporating contrast control circuitry in accordance with the invention. A signal receiving means illustrated as antenna 10 is connected to an input of a signal receiver 11. Signal receiver 11 receives a radio frequency (RF) carrier modulated by a composite video signal from antenna 10 and processes the received signal to provide a composite video signal to a video buffer 12. Video buffer 12 provides at least the synchronizing pulse portion of the composite video signal to an automatic gain control (AGC) circuit 13 and to a synchronizing pulse separator 14. AGC circuit 13 provides a gain control signal to signal receiver 11. Sync separator 14 provides separated synchronizing pulses to a vertical deflection circuit 15 and a horizontal deflection circuit 16. Deflection circuits 15 and 16 include deflection windings associated with an image display device illustrated as a cathode ray tube (CRT) 17 for deflecting the electron beam or beams therein. Horizontal deflection circuit 16 provides an output signal to a high voltage circuit 20 which develops the usual high operating or energization voltages for CRT 17. Video buffer 12 provides at least the chrominance portion of the composite video signal to a chroma processor 21 which processes the chrominance portion of the composite video signal to provide three color difference signals to a color matrix circuit 22. Color matrix 22 combines the color difference signals with the luminance or video signal to provide color signals to CRT 17.

Video buffer 12 further provides the composite video signal to a video amplifier including a plurality of stages. The output of video buffer 12 is connected to a delay line 23 which provides a usual delay equalization between the luminance and chrominance signals. The output of delay line 23 is coupled via a peaking or aperture correction delay 24 to an input of a video amplifier stage 25. Video amplifier 25 comprises a means for providing a video signal to a video signal input of a gain controlled stage illustrated as a video attenuator 26. An output of video attenuator 26 is connected via a video amplifier stage or buffer 27 to an output stage or video driver 30 of the video amplifier. Video driver 30 provides the output luminance portion of the composite video signal to color matrix 22.

Video attenuator 26 has a gain control input which is coupled to a gain control means for providing a gain control signal thereto. The gain control signal causes video attenuator 26 to alter the amplitude of signals applied to the video signal input by an amount determined by the gain control signal. The gain control means includes a means for providing a DC control signal illustrated as a contrast control 31. A control circuit 32 compares the DC control signal from contrast control 31 to a reference provided by a reference generator 33. Control circuit 32 is connected to the gain control input of video attenuator 26. The gain control means also includes a beam current feedback means 34. An output of high voltage circuit 20 is connected to beam current feedback means 34 which has an output connected to an input of control circuit 32. Beam current feedback means 34 detects the level of beam current drawn by CRT 17 from high voltage circuit 20. Beam current feedback means 34 and control circuit 32, accordingly, include automatic control means for automatically altering the gain of video attenuator 26 in response to the beam current of CRT 17.

A black level control means is connected to output stage 30 for detecting the black level of the video signal provided by output stage 30 and for providing a control signal to output stage 30 in response to the detected black level. The output of video driver 30 is connected to an input of a comparing means illustrated as a black level detector 35 which has an output connected to a control input of video driver 30. An adjustable control illustrated as a black level control 36 is also connected to the input of black level detector 35. Black level detector 35 compares the black level of the video signal from video driver 32 to a reference level provided by a source of reference potential 37. Black level control 36 permits viewer adjustment of the black level of the displayed image on CRT 17. Once the viewer selects the desired black level, the black level control means automatically controls the black level of the luminance signal.

The video processing system of FIG. 1 further includes aperture correction means for providing an aperture correction signal to the video signal input of video attenuator 26. The aperture correction means includes an aperture correction stage 40 which receives inputs from the output of delay line 23 and the output of peaking delay 24. Aperture corrector 40 generates an aperture correction signal including pre-shoot and over-shoot signals which are coupled to the video signal input of video attenuator 26. Accordingly, video attenuator 26 provides an aperture corrected video signal or combined video signal and aperture correction signal to video buffer 27 and video driver 30. The amplitude of the pre-shoot and over-shoot signals is controlled by a variable bias means illustrated as a peaking control 41 which has an output connected to a control input of aperture corrector 40.

A pair of differential outputs from aperture corrector 40 are coupled to automatic control means such as the inputs of a peaking amplifier 42. Peaking amplifier 42 provides differential outputs to a peaking detector 43 which provides an automatic control signal to aperture corrector 40. An output of peaking control 41 is connected to a tracking control 44 which provides outputs to peaking amplifier 42 and peaking detector 43. Tracking control 44 causes the automatic control means to track the viewer preference setting of peaking control 41.

The output of peaking delay 24 is also connected to an input of a noise separator 45 which provides noise suppression signals to peaking detector 43, black level detector 35, and chroma processor 21. Noise separator 45, for example, detects noise pulses which have amplitudes that exceed the synchronizing pulse amplitude to disable desired portions of the video processing system and chroma processor. The noise suppression signals inhibit the automatic control circuits from setting-up on noise pulses.

Outputs from vertical deflection circuit 15 and horizontal deflection circuit 16 are coupled to inputs of a blanking circuit 46 which provides blanking pulses to video amplifier 25, control circuit 32, and black level detector 35. The vertical and horizontal blanking pulses from blanking circuit 46 cause the video amplifier to blank CRT 17 during retrace or blanking intervals. Another output of blanking circuit 46 can be connected to an input of horizontal deflection circuit 16 to provide automatic frequency and phase control of the horizontal oscillator in circuit 16. Similarly, pulses from blanking circuit 46 can be coupled to chroma processor 21 to gate the color burst signal.

At least the luminance portion of the composite video signal is coupled from video buffer 12 by delay line 23 and the video amplifier to color matrix 22. The amplified and controlled video signal is matrixed with the color difference signals in color matrix 22 to provide suitable drive signals for CRT 17. The black level control means controls the black level of the displayed image in accordance with the viewer preference setting of black level control 36. If the black level of the received signal undesirably varies, the black level control means provides a control signal to video driver 30 to automatically adjust the black level.

Automatic contrast control is provided by varying the gain of video attenuator 26 in accordance with the viewer preference setting of contrast control 31 and the level of beam current drawn by CRT 17. The aperture correction or peaking signal provided by aperture corrector 40 is coupled to the video signal input of video attenuator 26 so that the aperture correction signal is amplified or attenuated by the same gain as the video signal. The amount of aperture correction is controlled by the viewer preference setting of peaking control 41 with the automatic control loop controlling the amount of peaking to track the setting of peaking control 41. The automatic control loop thus causes aperture corrector 40 to peak or depeak the video signal in response to deficient or excessive pre-shoot or over-shoot. The automatic control loop also causes aperture corrector 40 to depeak the video signal when the video signal contains excessive noise. The preferred implementation of the video processing system is in integrated circuit form with certain discrete components or circuits connected thereto.

Figure 2:
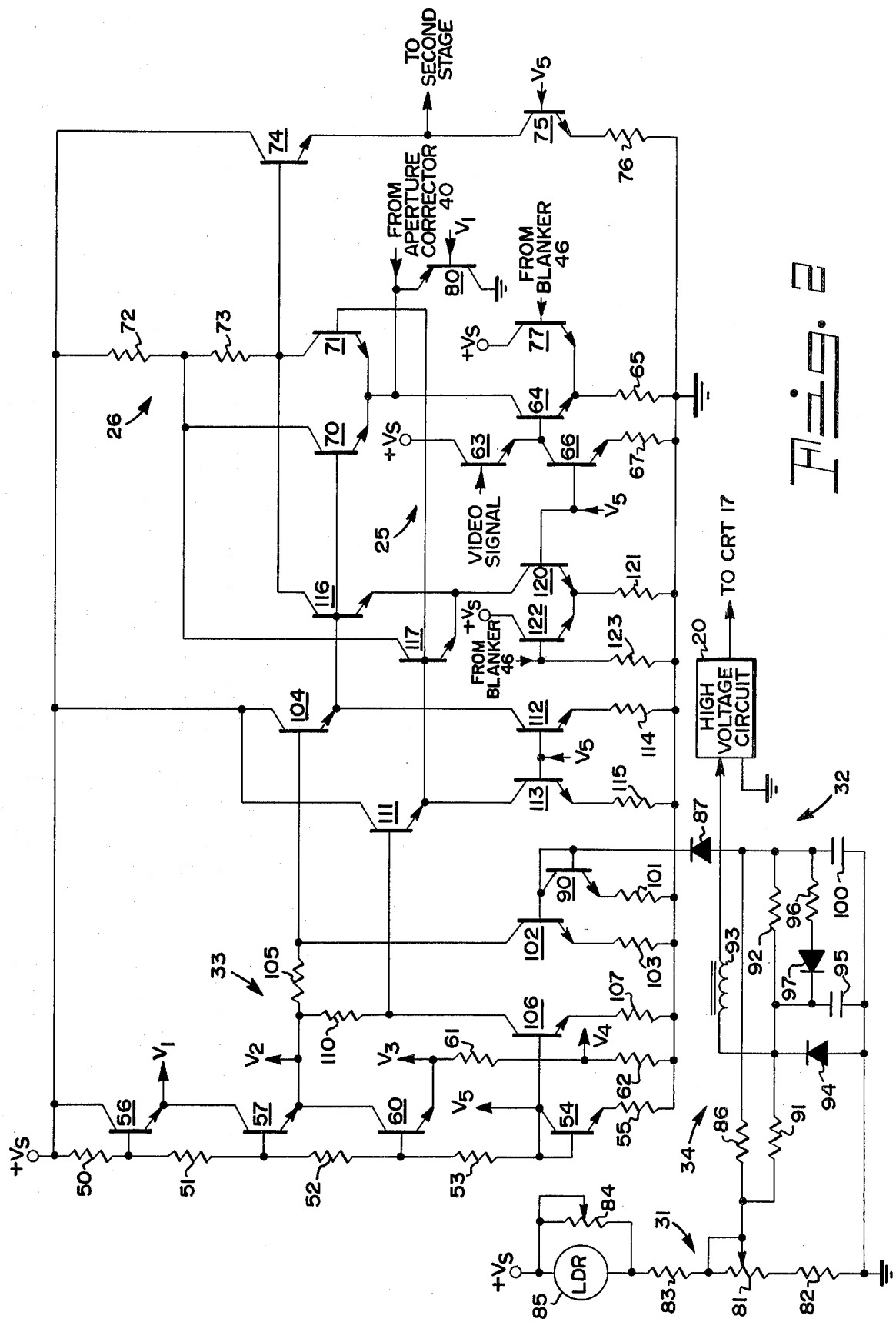
FIG. 2 is a schematic diagram of a portion of the block diagram of FIG. 1 including a portion of the video amplifier and contrast control circuitry in accordance with the preferred embodiments of the invention.

FIG. 2 is a schematic illustration of video amplifier 25, video attenuator 26, contrast control 31, control circuit 32, reference generator 33, and beam current feedback circuit 34. The contrast control operates to provide a contrast or gain control signal to video attenuator 26 to control the gain thereof between maximum and minimum limits.

In accordance with typical integrated circuit practice, a bias chain is utilized to provide various energizing, bias, and reference voltages. An external source of energizing voltage illustrated as a terminal $+V_S$ is connected by a chain of resistors 50, 51, 52, and 53 to a base and collector of a transistor 54. Transistor 54 further has an emitter connected by a resistor 55 to a common conductor illustrated as circuit ground. The junction between resistors 50 and 51 is connected to a base of a transistor 56 which has a collector connected to source $V_S$ and an emitter connected to a bias line $V_1$. The junction between resistors 51 and 52 is connected to a base of a transistor 57 which has a collector to bias line $V_1$ and an emitter connected to a bias line $V_2$ which comprises a source of reference voltage. The junction between resistors 52 and 53 is connected to a base of a transistor 60 which has a collector connected to bias line $V_2$ and an emitter connected to a bias line $V_3$. Bias line $V_3$ is connected by a resistor 61 in series with the resistor 62 to circuit ground. The junction between resistor 61 and 62 is connected to a bias line $V_4$. The base and collector of transistor 54 are connected to a bias line $V_5$. Accordingly, a variety of voltage levels are provided by the bias chain with the magnitude of the voltages depending upon the ratios of the various resistors. Emitter-follower transistors 56, 57, and 60 tend to diminish loading effects on the bias chain.

Transistor 54 is connected to provide a diode in integrated circuit form. All similarly connected transistors also function as diodes and may be called diodes herein. Video amplifier 25 includes a transistor 63 which has a base connected the output of peaking delay 24 of FIG. 1. A collector of transistor 63 is connected to source $V_S$ and an emitter is connected to a base of a transistor 64. An emitter of transistor 64 is connected by a resistor 65 to circuit ground. The emitter of transistor 63 is further connected to a collector of a transistor 66 which has an emitter connected by a resistor 67 to circuit ground. A base of transistor 66 is connected to the $V_5$ bias line.

The collector of transistor 64 is connected to the video signal input illustrated as the emitters of a pair of transistors 70 and 71 of video attenuator 26. A collector of transistor 70 is connected by a resistor 72 to source $V_S$, while a collector of transistor 71 is connected by a resistor 73 to the collector of transistor 70. Accordingly, transistors 70 and 71 have different load resistances, that is, resistors 72 and 73 comprise the collector load resistance of transistor 71 while resistor 72 comprises the collector load resistance of transistor 70.

The collector of transistor 71, which comprises the output of video attenuator 26, is connected to a base of a transistor 74, which comprises the input stage of video buffer 27. A collector of transistor 74 is connected to source $V_S$ and an emitter is connected to a second stage of video buffer 27. The $V_5$ bias line is connected to a base of a transistor 75 which has a collector connected to the emitter of transistor 74 and an emitter connected by a resistor 76 to circuit ground.

The video signal with negative-going black level is applied to the base of emitter-follower transistor 63. Transistor 66 is a current source for transistor 63. Transistor 63 shifts the level of the input video signal down by approximately 0.7 volts corresponding to the base-emitter volt drop of transistor 63. Transistor 64 comprises a video signal current source for video attenuator transistors 70 and 71. The collector current of transistor 71 flows through both of resistors 72 and 73 while the collector current of transistor 70 flows through resistor 72. Accordingly, when transistor 71 is conducting and transistor 70 is off, the gain of the video amplifier and attenuator is $G = (R72 + R73)/R65$. Similarly, when transistor 70 is conducting and transistor 71 is off, the gain is $G = R72/R65$. When both of transistors 70 and 71 are conducting, the gain is between the limits defined by the off states of transistors 70 and 71. Thus, by controlling the relative conduction of transistors 70 and 71, the gain of video attenuator 26 is controlled.

In one practical embodiment of the invention resistor 72 was 500 ohms, resistor 73 was 4,500 ohms, and resistor 65 was 1,000 ohms providing a range of gain control from 0.5 to 5.0. When both of transistors 70 and 71 are conducting, the gain is between those limits. The video signal with positive-going black level at the collector of transistor 71 is coupled via transistor 74 to the second stage of video buffer 27.

A transistor 77 has an emitter connected to the emitter of transistor 64 and a collector connected to source $V_S$. A base of transistor 77 receives a blanking signal from blanking circuit 46 to turn transistor 64 off during retrace or blanking intervals. A transistor 80 has a collector connected to circuit ground, an emitter connected to the emitters of transistors 70 and 71, and a base connected to the $V_1$ bias line. Transistor 80 is a clamp which limits the positive voltage at the emitters of transistors 70 and 71 to a desired maximum level.

Contrast control 31 includes a manually variable impedance or resistor 81 which has one end connected by a resistor 82 to circuit ground and the other end connected by a resistor 83 in series with a variable resistor 84 to source $V_S$. A light dependent resistor (LDR) 85 is connected in parallel with resistor 84. LDR 85 can be positioned to detect ambient light so that the contrast varies with the ambient lighting conditions. Variable resistor 84 is a range control for LDR 85. The output tap of variable resistor 81 is connected by a resistance means illustrated as a resistor 86 in series with a diode 87 to a base and collector of a transistor 90. The resistance means further includes a pair of resistors 91 and 92 connected in series between the output of variable resistor 81 and diode 87.

High voltage circuit 20 is typically energized by a secondary winding 93 of the horizontal output transformer contained in horizontal deflection circuit 16. The return side of winding 93 is connected to the junction of resistors 91 and 92. A diode 94 and a capacitor 95 are connected in parallel between circuit ground and the junction of resistors 91 and 92. A resistor 96 and a threshold device illustrated as a diode 97 are connected in series between diode 87 and the junction of resistors 91 and 92. A capacitor 100 is connected between diode 87 and circuit ground.

An emitter of transistor 90 is connected by a resistor 101 to circuit ground. The collector of transistor 90 is connected to a base of a transistor 102 which has an emitter connected by a resistor 103 to circuit ground. A collector of transistor 102 is connected to a base of a transistor 104 which has a collector connected to source $V_S$. The $V_2$ bias line is connected by a resistor 105 to the base of transistor 104. A transistor 106 has a base connected to the collector of transistor 54, an emitter connected by a resistor 107 to circuit ground, and a collector connected by a resistor 110 to bias line $V_2$. The collector of transistor 106 is further connected to a base of a transistor 111 which has a collector connected to source $V_S$.

The $V_5$ bias line is connected to bases of a pair of transistors 112 and 113. Transistor 112 has an emitter connected by a resistor 114 to circuit ground and a collector connected to an emitter of transistor 104. Transistor 113 has an emitter connected by a resistor 115 to circuit ground and a collector connected to an emitter of transistor 111. The emitter of transistor 104 is further connected to the base of transistor 70 and to a base of a transistor 116. A collector of transistor 116 is connected to the collector of transistor 71. The emitter of transistor 111 is further connected to the base of transistor 71 and to a base of a transistor 117 which has a collector connected to the collector of transistor 70. A transistor 120 has a base connected to the $V_5$ bias line, an emitter connected by a resistor 121 to circuit ground, and a collector connected to emitters of transistors 116 and 117. A transistor 122 has a collector connected to source $V_S$, an emitter connected to the emitter of transistor 120 and a base connected by a resistor 123 to circuit ground. An output from blanking circuit 46 is connected to the base of transistor 122 so that transistor 120 is turned off during blanking or retrace intervals.

In operation, transistors 54 and 106 are a current mirror or current source wherein the collector current of transistor 106 is a constant current determined primarily by the ratio of resistors 107 and 55 and the magnitude of bias voltage $V_5$. Similarly, transistors 90 and 102 are a current mirror, current source, or current multiplier wherein the collector current of transistor 102 is variable and accurately tracks the input current through diode 87. The input or contrast control current through diode 87 is dependent upon the setting of contrast control 81, the resistance of LDR 85, and the feedback signal from high voltage circuit 20 representative of beam current in CRT 17.

At minimum contrast the input current through diode 87 is substantially zero so that the collector current of transistor 102 is also substantially zero. Negligible current flows through resistor 105 so that there is substantially no volt drop across resistor 105. The collector current of transistor 106 flows through resistor 110 to develop a differential voltage across the bases of transistors 104 and 111. This differential voltage also appears at the emitters of transistors 104 and 111 and is coupled to the bases of transistors 70 and 71. Transistors 112 and 113 are matching current sources for transistors 104 and 111, respectively. At minimum contrast the circuit constants are such that the volt drop across resistor 110 is sufficient to cause transistor 71 to be substantially off and transistor 70 to conduct all of the emitter current of video attenuator 26. When transistor 71 is off, the gain of video attenuator 26 is reduced to a minimum corresponding to minimum contrast.

At maximum contrast the input current through diode 87 causes the collector current of transistor 102 to be substantially twice the collector current of transistor 106. Assuming resistors 105 and 110 are of equal size, the volt drop across resistor 105 will be twice the volt drop across resistor 110 so that a differential voltage will be developed across the bases of transistors 111 and 104 in the opposite direction. This differential voltage will cause transistor 70 to be substantially off while transistor 71 conducts all of the emitter current. When transistor 70 is off, the gain of video attenuator 26 is at a maximum corresponding to maximum contrast.

Accordingly, the base of transistor 71 comprises a first gain control input of video attenuator 26, and resistor 110 and the transistors and source connected therewith comprise a first bias means for providing a relatively constant voltage to the first gain control input. Similarly, the base of transistor 70 comprises a second gain control input of video attenuator 26, and resistor 105 and the transistors and source connected therewith comprise a second bias means for providing a variable bias to the second gain control input. Video attenuator 26 controls the amplitude of video signals applied to the emitters of transistors 70 and 71 in accordance with the difference between the voltages applied to the first and second gain control inputs.

In the above-mentioned practical embodiment, the collector current of transistor 106 was arranged to be approximately 100 microamperes while the range of contrast control current through transistor 102 was approximately 0-200 microamperes. Since the volt drop across resistor 110 remained substantially constant, the voltage at the base of transistor 111, and hence, the voltage at the base of transistor 71, also remained constant. The volt drop across resistor 105, however, varied from approximately 0 to 200 millivolts (0.2 volts). Accordingly, the differential voltage at the bases of transistors 104 and 111, and hence, the differential gain control voltage at the bases of transistors 70 and 71, varied from approximately $+0.1$ volts to $-0.1$ volts. This differential voltage was sufficient to switch all of the video signal current at the collector of transistor 64 through transistor 70 at minimum contrast and through transistor 71 at maximum contrast.

Emitter-follower transistors 104 and 111 provide low input impedances to transistors 70 and 71 to minimize the AC base-emitter voltage of transistors 70 and 71. Minimizing the AC base-emitter voltage of transistors 70 and 71 minimizes linearity distortion of the video signal by video attenuator 26.

Transistors 116 and 117 comprise a form of doubly balanced modulator to hold the black level at the collector of transistor 71 substantially constant. To understand the operation of this circuit, assume that the current through current source transistor 120 is 1.0 milliampere and that the black level current through transistor 64 is also 1.0 milliampere. Transistor 116 is driven by transistor 104 while transistor 117 is driven by transistor 111. Accordingly, transistors 70 and 116 will have the same collector currents while transistors 71 and 117 will have the same collector currents regardless of the contrast control setting. Thus, at black level the currents through resistors 72 and 73 will remain constant regardless of the contrast control setting. Of course, when the video signal is greater than black level, the current through transistor 64 will be greater than 1.0 milliamperes so that the balanced condition no longer applies. Accordingly, the doubly balanced modulator including transistors 116 and 117 tends to hold black level at the base of transistor 74 relatively constant so that the range of control required of the black level control is not as great. While the circuit was described as if perfect balance at black level were obtained, perfect balance is not essential because the black level control compensates for variations in black level at the base of transistor 74.

The feedback loop including high voltage circuit 20 provides automatic gain control for the contrast control. This circuit controls the difference between the white level and black level of the video signal. Since the black level is subsequently controlled, the automatic contrast control effectively controls the white level of the video signal.

The beam current in CRT 17 flows through high voltage circuit 20 which can be a typical voltage multiplier circuit. Accordingly, the current drawn through winding 93 on the horizontal output transformer is a measure of the beam current in CRT 17. Capacitors 95 and 100 filter the current through winding 93 to provide a voltage thereacross which varies with the average beam current in CRT 17. The filter time constant is sufficiently long so that the average beam current is detected. Otherwise the feedback loop would tend to wash out the displayed image on CRT 17.

The contrast control current from variable resistor 81 flows through resistor 86 and series resistors 91 and 92 to control the collector current of transistor 102. When the beam current increases, the voltage across capacitor 95 decreases so that less current flows through resistor 92 and the contrast control current correspondingly decreases. Similarly, when the average beam current decreases, the voltage across capacitor 95 increases so that greater current flows through resistor 92 to increase the gain of video attenuator 26 to increase the contrast. Thus, the contrast is automatically controlled by the average beam current level of the beam current in CRT 17.

As was indicated previously, the feedback loop operates on the average beam current in CRT 17 so that the displayed image is not washed out. The feedback constant or loop gain is also sufficiently low so that "soft" control is provided. Changes in the brightness level from one scene to another cause a corresponding change in beam current. Since this variation in beam current is desired, the feedback loop has a sufficiently low feedback constant or gain to permit scene-to-scene variations. The feedback constant also should be sufficiently low to permit the viewer preference control 81 to have a reasonable range of control.

If the beam current increases sufficiently, diode 97 will become forward biased to effectively place resistor 96 in parallel with resistor 92. Resistor 96 is much smaller than resistor 92 so that the automatic control loop rapidly reduces the contrast control current through diode 87. At some level of beam current the current through diode 87 will be reduced to zero thereby turning video attenuator 26 to minimum gain and minimum contrast. Accordingly, the automatic feedback loop also provides beam current limiting. The threshold for the beam current limiter tracks the setting of contrast control 81 so that at lower contrast settings the beam current limiting threshold is proportionally reduced. Diode 87 prevents reverse current flow out of transistors 90 and 102. Diode 94 prevents the voltage at the junction of resistors 91 and 92 from becoming negative due to excessively high beam currents.

In one practical embodiment of the invention resistors 86 and 92 were 68,000 ohms while resistors 91 and 96 were 6,800 ohms. Contrast control 81 provided an output voltage of less than 1.0 volts at minimum contrast and about 8–12 volts at maximum contrast, both depending upon the resistance of LDR 85 and the setting of variable resistor 84.

Accordingly, contrast control circuitry for a video processing system has been shown and described. Contrast control circuitry in accordance with the invention possesses numerous advantages over the prior art. Contrast control circuitry for the video processing system is provided in a form suitable for integration together with the other portions of the video processing system in an integrated circuit. The circuit requires minimal external connections to the integrated circuit thereby decreasing assembly and circuit costs and increasing reliability. Furthermore, superior performance is obtained with minimal circuit complexity both internal and external to the integrated circuit. Automatic contrast is provided without substantial circuit complexity and cost and without the need for peak detecting or sample and hold circuitry. Beam current limiting is also provided without significant additional circuitry. Additionally, the maximum beam current available for the CRT is determined accurately by circuit component values external to the integrated circuit thereby permitting the use of a single integrated circuit design in a variety of television receivers with a wide variety of picture tubes. In this connection it should be noted that contrast control 31 and the portion of control circuit 32 through diode 87 is preferably external to the integrated circuit.

While there has been shown and described what is at present considered the preferred embodiment of the invention it will be obvious to those skilled in the art that various changes and modifications may be made therein without departing from the invention as defined by the appended claims.

What is claimed is:

1. Contrast control circuitry for a video processing system comprising:
   a gain controlled stage having a video signal input and first and second gain control inputs;
   first bias means for providing a relatively constant voltage to said first gain control input;
   second bias means for providing a variable voltage to said second gain control input, said gain controlled stage controlling the amplitude of video signals applied to said video signal input in accordance with the difference between the voltages applied to said first and second gain control inputs;
   a control circuit connected to said second bias means, said control circuit including a manually variable impedance for causing said second bias means to vary said variable voltage to cause the gain of said gain controlled stage to vary between maximum and minimum limits; and
   wherein said first bias means includes a first resistor connected between a source of reference voltage and said first gain control input and a constant current source connected to said first resistor for causing a relatively constant current to flow therethrough, and said second bias means includes a second resistor connected between said source of reference voltage and said second gain control input and a variable current source connected to said second resistor and to said control circuit for causing a variable current to flow through said second resistor in response to the setting of said manually variable impedance.

2. In a television receiver having a cathode ray tube and a high voltage circuit connected to said cathode ray tube for providing an energizing voltage thereto, contrast control circuitry for a video processing system comprising:
   a gain controlled stage having a video signal input and a gain control input;
   a manually variable impedance;
   resistance means connected to an output of said impedance;
   bias means connected between said resistance means and said gain control input of said gain controlled stage for providing a gain control signal to said gain control input in response to the setting of said variable impedance;
   feedback means connected between said high voltage circuit and said resistance means for modifying said gain control signal in response to the current through said high voltage circuit to automatically control the contrast of video signals applied to said video signal input; and wherein said resistance means includes a first resistor connected between said variable impedance and said bias means and second and third resistors connected in series between said variable means and said bias means, and said feedback means is connected to the junction between said second and third resistors for decreasing the current flowing from said variable impedance to said bias means by an amount proportional to the current through said high voltage circuit.

3. Contrast control circuitry as defined in claim 2 wherein said resistance means includes a diode connected in parallel with said third resistor for rapidly reducing the current flowing from said variable impedance to said bias means when excessive current flows through said high voltage circuit sufficient to forward bias said diode.

4. In a television receiver having a cathode ray tube and a high voltage circuit connected to said cathode ray tube for providing an energization voltage thereto, contrast control circuitry for a video processing system comprising:
 a gain controlled stage having a video signal input and first and second gain control inputs;
 first bias means for providing a relatively constant voltage to said first gain control input;
 second bias means for providing a variable voltage to said second gain control input, said gain controlled stage controlling the amplitude of video signals applied to said video signal input in accordance with the difference between the voltages applied to said first and second gain control inputs;
 a manually variable impedance;
 resistance means connected between said variable impedance and said second bias means for causing said second bias means to vary said variable voltage to cause the gain of said gain controlled stage to vary between maximum and minimum limits in response to the setting of said variable impedance; and
 wherein a diode is connected between said resistance means and said high voltage circuit for rapidly reducing the current flowing from said variable impedance to said bias means when excessive current flows through said high voltage circuit sufficient to forward bias said diode.

5. Contrast control circuitry as defined in claim 4 wherein said first bias means includes a first resistor connected between a source of reference voltage and said first gain control input and a constant current source connected to said first resistor for causing a relatively constant current to flow therethrough, and said second bias means includes a second resistor connected between said source of reference voltage and said second gain control input and a variable current source connected to said second resistor and to said resistance means for causing a variable current to flow through said second resistor in response to the setting of said manually variable impedance.

* * * * *